United States Patent
Lu et al.

(10) Patent No.: US 11,061,974 B2
(45) Date of Patent: Jul. 13, 2021

(54) FACILITATING DISCOVERY OF INFORMATION ITEMS USING DYNAMIC KNOWLEDGE GRAPH

(71) Applicant: Microsoft Technology Licensing, LLC, Redmond, WA (US)

(72) Inventors: Yumao Lu, Beijing (CN); Ling Li, Beijing (CN); Che-Hsien Lee, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 459 days.

(21) Appl. No.: 15/776,053

(22) PCT Filed: Dec. 14, 2015

(86) PCT No.: PCT/CN2015/097234
§ 371 (c)(1),
(2) Date: May 14, 2018

(87) PCT Pub. No.: WO2017/100970
PCT Pub. Date: Jun. 22, 2017

(65) Prior Publication Data
US 2019/0026372 A1    Jan. 24, 2019

(51) Int. Cl.
*G06F 16/00*    (2019.01)
*G06F 16/9535*    (2019.01)
(Continued)

(52) U.S. Cl.
CPC .......... *G06F 16/9535* (2019.01); *G06F 16/00* (2019.01); *G06F 16/904* (2019.01); *G06F 16/9038* (2019.01); *G06F 16/9537* (2019.01)

(58) Field of Classification Search
CPC .... G06F 16/36; G06F 16/367; G06F 16/9535; G06F 16/24; G06F 40/103
(Continued)

(56) References Cited

U.S. PATENT DOCUMENTS

| | | |
|---|---|---|
| 8,364,669 B1 | 1/2013 | Chowdhury et al. |
| 8,799,274 B2 | 8/2014 | Stephens |

(Continued)

FOREIGN PATENT DOCUMENTS

| | | |
|---|---|---|
| CN | 101019118 A | 8/2007 |
| CN | 103226569 A | 7/2013 |

(Continued)

OTHER PUBLICATIONS

Search Report and Written Opinion in European Application No. EP 15910444.7, dated Apr. 2019, 9 pages.
(Continued)

*Primary Examiner* — Alexandria Y Bromell

(57) ABSTRACT

A computer-implemented technique is described herein for facilitating discovery of information items. The technique involves providing at least one set of indicators to a user via a user interface presentation. The indicators represent respective topics. Each distance d between a pair of respective indicators, associated with respective topics (t, t'), is based on at least: a similarity between the topic t and the topic t' as expressed by a knowledge graph; and a dynamic and personalized joint measure of the user's current interest in the topic t and the topic t'. The technique further involves providing at least one information item to the user in response to the user's engagement with the user interface presentation.

20 Claims, 10 Drawing Sheets

(51) Int. Cl.
*G06F 16/9537* (2019.01)
*G06F 16/9038* (2019.01)
*G06F 16/904* (2019.01)

(58) Field of Classification Search
USPC .......................................... 707/706; 715/204
See application file for complete search history.

(56) References Cited

U.S. PATENT DOCUMENTS

| | | | |
|---|---|---|---|
| 2010/0153094 A1 | 6/2010 | Lee et al. | |
| 2014/0046934 A1 | 2/2014 | Zhou et al. | |
| 2014/0108453 A1 | 4/2014 | Venkataraman et al. | |
| 2014/0173425 A1 | 6/2014 | Hailpern et al. | |
| 2014/0372425 A1 | 12/2014 | Ayoub et al. | |
| 2015/0006512 A1 | 1/2015 | Alfonseca et al. | |
| 2015/0095303 A1 | 4/2015 | Sonmez et al. | |
| 2015/0099255 A1* | 4/2015 | Aslan | G06Q 50/01 434/350 |
| 2015/0127632 A1 | 5/2015 | Khaitan et al. | |
| 2015/0169758 A1* | 6/2015 | Assom | G06F 16/36 707/603 |
| 2015/0186528 A1 | 7/2015 | Rao et al. | |
| 2015/0186531 A1 | 7/2015 | Agarwal et al. | |
| 2015/0227529 A1 | 8/2015 | Kumthekar et al. | |
| 2015/0256636 A1 | 9/2015 | Spivack et al. | |
| 2015/0278691 A1 | 10/2015 | Xia et al. | |
| 2015/0286709 A1 | 10/2015 | Sathish et al. | |
| 2015/0347480 A1* | 12/2015 | Smart | G06F 16/2237 707/743 |
| 2015/0356186 A1 | 12/2015 | Tolga et al. | |

FOREIGN PATENT DOCUMENTS

| | | |
|---|---|---|
| CN | 103365906 A | 10/2013 |
| CN | 103399891 A | 11/2013 |
| CN | 103886090 A | 6/2014 |
| CN | 104537115 A | 4/2015 |
| CN | 104572734 A | 4/2015 |
| CN | 104969173 A | 10/2015 |
| WO | 2014059342 A2 | 4/2014 |
| WO | 2014139057 A1 | 9/2014 |
| WO | 2015182064 A1 | 2/2015 |
| WO | 2015122691 A1 | 8/2015 |
| WO | 2015153387 A1 | 10/2015 |

OTHER PUBLICATIONS

Notice of the Second Office Action in Chinese Patent Application No. 201580077336.0, dated Aug. 25, 2020, 12 pages.
English-language summary of Office Action in Chinese Patent Application No. 201580077336.0, dated Aug. 25, 2020, 2 pages.
English-language summary of Office Action in Chinese Patent Application No. 201580077336.0, Office Action dated Feb. 3, 2020, 1 page.
Van Hemel, et al., "Smart Search in Newspaper Archives Using Topic Maps," in Proceedings of the 7th ICCC/IFIP International Conference on Electronic Publishing, From Information to Knowledge, Jun. 25, 2003, 9 pages.
"What do the lines between terms in Sonar indicate about their relationship?," available at <<https://bottlenose.uservoice.com/knowledgebase/articles/367682whatdothelinesbetween>>, Bottlenose Feedback & Support, Bottlenose.com, Los Angeles, CA, accessed on Dec. 16, 2015, 2 pages.
"Does the distance between terms on Sonar indicate relevance?," available at <<https://bottlenose.uservoice.com/knowledgebase/articles/367689doesthedistancebetween>>, Bottlenose Feedback & Support, Bottlenose.com, Los Angeles, CA, accessed on Dec. 16, 2015, 2 pages.
Search Report issued in PCT Application No. PCT/CN2015/097234, dated Sep. 19, 2016, 3 pages.
Written Opinion issued in PCT Application No. PCT/CN2015/097234, dated Sep. 19, 2016, 4 pages.
Translation of Chinese patent document No. CN103226569A, available at <<https://patents.google.com/patent/CN103226569A/en?oq=cn103226569>>, accessed on May 12, 2018, 9 pages.
Translation of Chinese patent document No. CN103399891A, available at <<https://patents.google.com/patent/CN103399891A/en?oq=cn+103399891>>, accessed on May 12, 2018, 9 pages.
Translation of Chinese patent document No. CN103886090A, available at <<https://patents.google.com/patent/CN103886090A/en?oq=cn+103886090>>, accessed on May 12, 2018, 16 pages.
Translation of Chinese patent document No. CN104969173A, available at <<https://patents.google.com/patent/CN104969173A/en?oq=cn+104969173>>, accessed on May 12, 2018, 14 pages.
Notice of the First Office Action in Chinese Patent Application No. 201580077336.0, dated Feb. 3, 2020, 16 pages.

* cited by examiner (Presentation of Information Items pertaining to the topic of "Xbox")

FACILITATING DISCOVERY OF INFORMATION ITEMS USING DYNAMIC KNOWLEDGE GRAPH

BACKGROUND

Current information retrieval technology enables a user to explore a vast amount of information on a day-to-day basis. For example, a user may use a conventional browser to access a large number of news-related information items from various online repositories of such information. While the availability of such information resources enriches the user, it also introduces challenges. For instance, a user may have difficulty discovering information items that match his or her interests within such a large pool of items.

More specifically, a user typically goes about locating relevant information items by specifying a search query that describes the user's focus of interest. A search engine returns a collection of information items that match the query. But a user may have difficulty formulating an appropriate search query, e.g., because, in some cases, the user may not have a good understanding of his or her focus of inquiry at the outset. The user may also have difficulty in navigating through the search results provided by the search engine. As an end result, the user may find it necessary to spend a considerable amount of time hunting for relevant information items; this search practice, in turn, leads to poor user experience and the inefficient use of computing resources. In still other cases, the user may decide to abandon his or her search without finding the information items being sought.

SUMMARY

A computer-implemented technique is described herein for facilitating the discovery of information items, such as, but not limited to, news-related information items. The technique involves providing a set of indicators to a user via a user interface presentation. The indicators represent respective topics. Each distance d between a pair of respective indicators, associated with two respective topics (t, t'), is based on at least: a similarity between the topic t and the topic t' as expressed by a knowledge graph; and a dynamic and personalized measure of the user's joint interest in the topics (t, t'). The technique further involves providing at least one information item to the user in response to the user's engagement with the user interface presentation.

The technique enables a user to quickly and efficiently access information items; this is because the technique presents topics, and relations among topics, that focus on the user's prevailing interests. For instance, the technique may present different sets of topics to different users based on their respective interests in topics and relations among topics. The technique may also present different sets of topics to the same users at different times, reflecting changes in the user's interests in topics and the relations among topics over time. As a final result, the technique provides good user experience and reduces the consumption of computing resources (e.g., by forgoing an extended browsing session in which the user would otherwise be required to hunt for relevant information items).

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
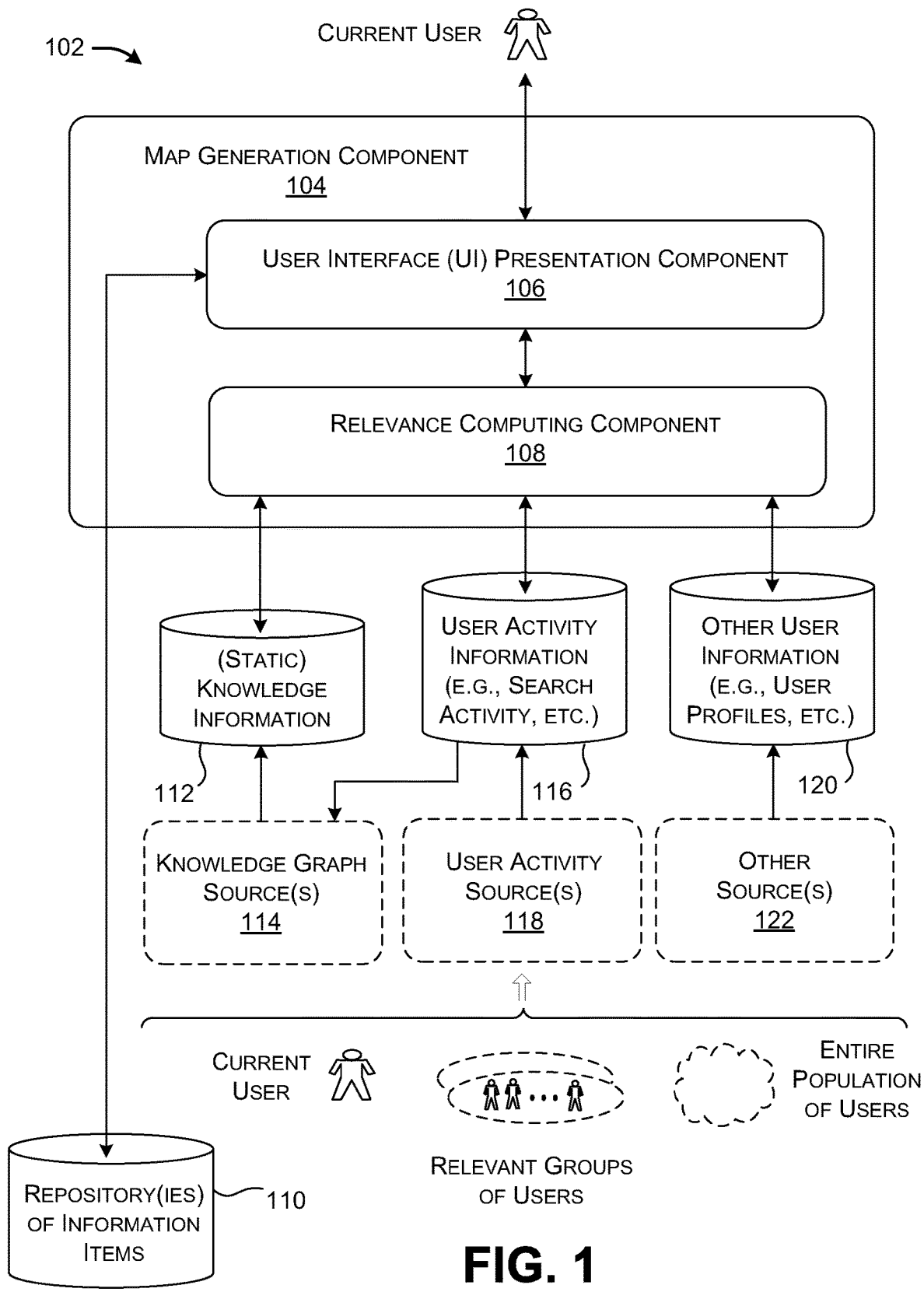
FIG. 1 shows a system that includes a map generation component. The map generation component enables a user to explore topics and access relevant information items.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for facilitating the exploration of topics and the retrieval of relevant information items. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows a system 102 that includes a map generation component 104. The map generation component 104 enables a user to explore topics and access relevant information items. The map generation component 104, in turn, includes two sub-components: a user interface (UI) presentation component 106 and a relevance computing component 108.

Figure 4:
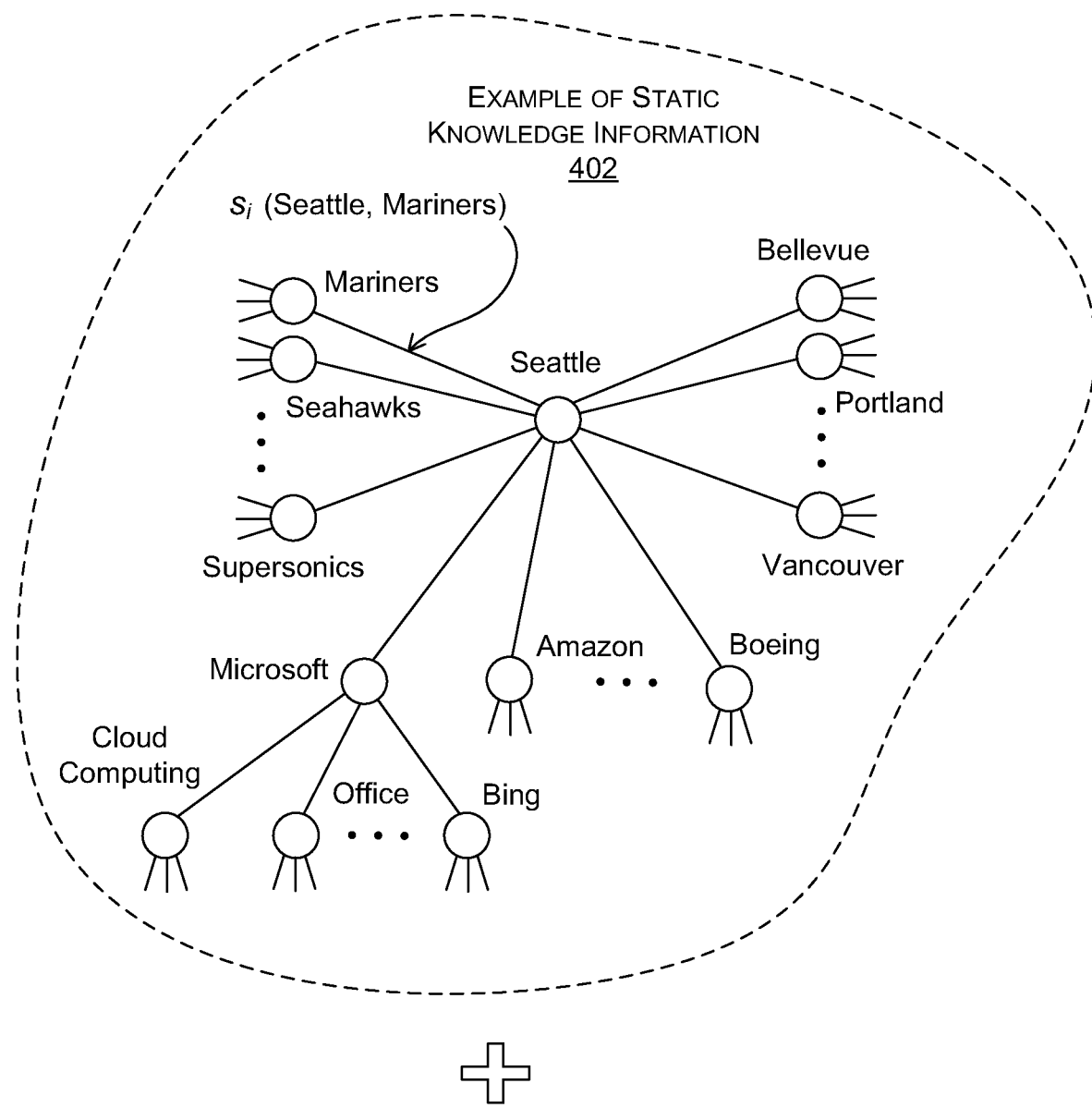
FIG. 4 provides a high-level summary of one manner of operation of the map generation component of FIG. 1.

Jumping ahead momentarily in the series of figures, FIG. 4 shows a summary of one manner of operation of the map generation component 104. As shown there, the map generation component 104 receives two principal inputs: topic-to-topic knowledge information 402 provided by a knowledge graph, and dynamic trend information 404. The knowledge information 402 represents relationships among a plurality of pairs of topics. For example, the merely illustrative knowledge information 402 shown in FIG. 4 assigns two nodes to the respective concepts of "Seattle" and "Mariners" (where the label "Mariners" refers to the name of a baseball team in the city of Seattle, Wash.). The knowledge information 402 also represents the relationship between these two topics using an edge that connects the two associated nodes. Still further, the knowledge information 402 represents the strength of the relationship between these two topics with a topic-to-topic score $s_i$(Seattle,Mariners). In one implementation, the knowledge information 402 corresponds to a static and user-independent expression of the relationships among topics, compiled on the basis of one or more information sources (to be described below).

The dynamic trend information 404, on the other hand, represents a current user's personalized interest in different topics (and the user's personalized interest in different relationships among topics) with respect to some specified timeframe (e.g., the last day, week, month, quarter, year, etc.). The dynamic trend information 404 embodies various components of information. As a first part, the dynamic trend information 404 captures trends pertaining to relationships among topics based on the behavior of an individual user himself or herself. As a second part, the dynamic trend information 404 captures trends in the relationships among topics based on the behavior of one or more groups of users with which the user is affiliated. As a third part, the dynamic trend information 404 expresses trends in the relationships among topics based on global user-independent data sources. The following explanation provides additional information regarding the composition of the dynamic trend information 404.

Next, the map generation component 104 combines the knowledge information 402 with the dynamic trend information 404 to generate a dynamic ontology 406. That dynamic ontology 406 expresses relationships among a plurality of pairs of topics. But unlike the static knowledge information 402, the dynamic ontology 406 expresses relationships which reflect the current trending interests of the user. For example, the dynamic ontology can replace the topic-to-topic score $s_i$(Seattle,Mariners) with a relevance score $r_u$(u, Seattle, Mariners); that relevance score reflects the strength of the relationship between the topics of "Seattle" and "Mariners," with respect to the current user's prevailing interest, where u denotes the current user.

Returning to FIG. 1, the UI presentation component 106 displays one or more user interface presentations through which the user may navigate the dynamic ontology 406. The UI presentation component 106 also allows the user to leverage the dynamic ontology 406 to identify relevant information items of any type(s), and then to access those information items. The UI presentation component 106 may access the information items from any repository(ies) 110. For instance, the repository(ies) 110 may correspond to one or more data stores that are accessible via a wide area network, such as the Internet.

In some implementations, the information items that are accessed may correspond to news-related information items that pertain to the various topics represented by the dynamic ontology 406. Alternatively, or in addition, the information items may correspond to documents pertaining to various topics; but these documents do not necessarily correspond to news-related items. Alternatively, or in addition, the information items may correspond to messages of various types sent and/or received by users (e.g., Email messages, instant messaging messages, social network postings, etc.), and so on.

In one particular manner of operation, the UI presentation component 106 receives a selection from the user which identifies a topic that represents the user's current focus of interest. That topic is referred to herein as the "home-focus topic." The UI presentation component 106 can then present a topic map which visually represents a set of indicators, including a home-focus indicator associated with the home-focus topic, and one or more other indicators associated with topics that are determined to be related to the home-focus topic.

The UI presentation component 106 constructs its topics maps based on relevance scores provided by the relevance computing component 108. For instance, the relevance computing component 108 generates the above-mentioned relevance score $r_u(Seattle,Mariners)$, which expresses the strength of the relationship between the topics of "Seattle" and "Mariners," with respect to the current trending interests of the current user u. The relevance score for this pair of concepts determines the manner in which an indicator associated with "Mariners" is placed relative to an indicator associated with "Seattle" on a user interface presentation, if, indeed, these indicators are presented at all in a particular topic map.

The relevance computing component 108 can generate the relevance scores based on multiple sources of information. For example, the relevance computing component 108 extracts knowledge information provided in one or more data stores 112. One or more knowledge graph sources 114, in turn, provide the knowledge information. In one approach, an existing third-party source may provide the knowledge information. Representative existing knowledge graphs include, but are not limited to, the YAGO knowledge base, the DBpedia knowledge base, the WordNet lexical database, the FreeBase knowledge base, etc.

In other cases, a custom graph-generating component (not shown) may generate custom knowledge information by drawing on various combinations of sub-sources. For example, one such a custom graph-generating component may mine the structured information provided by Wikipedia to determine related concepts. Alternatively, or in addition, a custom graph-generating component may mine user activity information (such as online searches) to determine relationships among topics and the strengths of these relationships. For example, a custom graph-generating component may identify related searches performed by users when searching for information, and then use those related searches as evidence of related concepts. Alternatively, or in addition, the custom graph-generating component may identify the co-occurrence of terms in documents, and then use such identified co-occurrences as evidence of related concepts, and so forth. Alternatively, or in addition, the custom graph-generating component may mine any data maintained by one or more social network sites to identify related concepts, and so on. The strength of a static relationship between two concepts in the knowledge information 402 can be based on any environment-specific measure(s), such as manually-specified relationship measures, co-occurrence measures, etc.

The relevance computing component 108 may also receive user activity information from one or more data stores 116. The user activity information represents any behavior of a user that may express the current interests of the user over a span of time. One or more user activity sources 118, in turn, provide the user activity information. For example, a search engine may represent one kind of user activity source. The search engine may maintain a query log that describes the queries submitted by each user, the "views" or "impressions" provided to each user in response to the queries (in which the user is notified of information items that match the user's queries), and the selections (e.g., "clicks") or other behavior performed by each user in response to his or her searches. A social networking site may represent another kind of user activity source. The social networking site may maintain a log that describes messages that each user exchanges with other users, likes and dislikes identified by each user, the postings made by each user, and so on.

More generally stated, the user activity sources 118 can mine data from sources having different user-related scopes. In a first scope, the user activity sources 118 may mine activity information that specifically focuses on the individual behavior the current user. In a second scope, the user activity sources 118 may mine activity information associated with one or more groups of users to which the current user has an affiliation. In a third scope, the user activity sources 118 may mine activity information regarding an entire population of users. The activity information mined from the entire population of users can be considered user-independent because it does not particularly discriminate between the users from which it originated; it represents only general trends among the entire population.

The relevance computing component 108 may also consult other user information which reflects the interests from one or more other data stores 120. For example, the other user information may correspond to profile information which describes the preferences and other characteristics of each user. One or more other sources 122, in turn, provide the other user information. For example, one or more social networking sites may provide user profiles that each user explicitly creates. For example, a social networking site may maintain a user profile that identifies the demographic characteristics of the user (education level, nature of employment, place of residence, etc.), the likes and dislikes of the user, and so on.

In all cases, the system 102 maintains appropriate safeguards to ensure that any use of personal information is in compliance with applicable laws, societal norms, and the preferences of the individual user. For example, the system 102 may collect and utilize the personal information for a user only after being given explicit permission by the user to do so.

Figure 2:
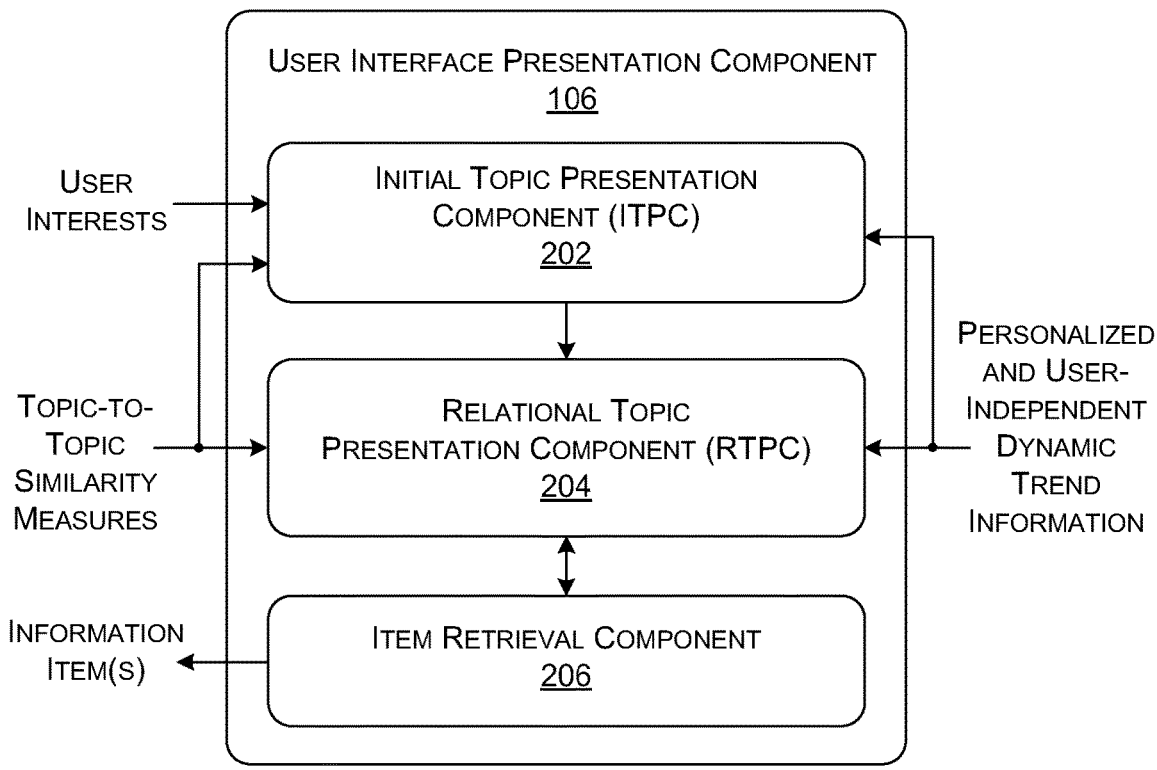
FIG. 2 shows one implementation of a user interface (UI) presentation component, which is a part of the map generation component of FIG. 1.

Advancing to FIG. 2, this figure shows one implementation of the UI presentation component 106, which is a part of the map generation component of FIG. 1. The UI presentation component 106 includes an initial topic presentation component (ITPC) 202. As the name of this component suggests, the ITPC 202 operates by optionally presenting an initial set of topics for the user's consideration when the user first activates the map generation component 104. In one implementation (described in greater detail below), the ITPC 202 presents the initial set of topics by identifying the interests of the current user, and then presenting initial topics which match those interests.

A relational topic presentation component (RTPC) 204 presents a visualization of the dynamic ontology 406. In one approach, the RTPC 204 receives the user's selection of a home-focus topic, such as the topic of "Seattle." The RTPC 204 can then determine the other topics that are strongly related to the home-focus topic, taking into account the dynamically changing interests of the current user. The RTPC 204 can then display indicators (e.g., icons, textual labels, etc.) associated with the identified topics.

Note that the ITPC 202 is considered optional because it can be omitted. If omitted, the RTPC 204 can prompt the user to manually specify an initial home-focus topic, e.g., by typing that topic into a query input interface (instead of choosing a home-focus topic from the set of initial topics provided by the ITPC 202). Or the RTPC 204 can automatically choose a default home-focus topic based on the identified interests of the user and/or another other factor(s).

An item retrieval component 206 provides logic that allows a user to discover and access relevant information items after viewing the visualizations provided by the RTPC 204.

The ITPC 202 and the RTPC 204 can be implemented using any logic. In one non-limiting implementation, the ITPC 202 may identify a first subset of initial topics based on interests explicitly specified by the user. For example, the user may create a profile that indicates that he or she is interested in the Seahawks, a football team based in Seattle, Wash. Based on this user profile, the ITPC 202 may create an initial topic (and a corresponding initial indicator) associated with the topic of "Seahawks."

In addition, or alternatively, the ITPC 202 can identify an initial relevance score $r_u(t)$ associated with each topic $t$ identified in an ontology, such as each node in the knowledge information 402 shown in FIG. 4. The ITPC 202 can then identify a subset of the topics having the highest initial relevance scores as initial topics. The ITPC 202 may then include at last some of these highly ranked topics in the initial set of topics.

In one implementation, the ITPC 202 can generate the initial relevant score $r_u(t)$ for a candidate topic $t$ based on the following illustrative equation:

$$r_u(t) = V(t)w(u,t) + \alpha \Sigma_{k \neq u} w(k,t) g_u(u,k) + \beta \Sigma_{j \neq t} V(j) s_i(t,j) \quad (1).$$

In this equation, $V(t)$ represents a total volume of information items regarding the particular topic $t$. More specifically, $V(t)$ may express a number of times that a search engine presents an information item (e.g., a news article) pertaining to the topic $t$ in response to users submitting $t$ as a search query within a specified window of time (such as within the last day, week, month, quarter, year, etc.). In other words, $V(t)$ represents a number of impressions for the topic $t$ when users submit $t$ as a search query. Note that $V(t)$ is a dynamic measure because it reflects the aggregate user behavior within a specified window of time. But $V(t)$ is a not a user-specific measure because it does not take into account the activity of any particular user or user group. In summary, $V(t)$ may be regarded as an indication of the time-varying user-independent importance of topic $t$.

On the other hand, $w(u,t)$ reflects the current user's interest in the topic $t$ with respect to the identified window of time (such as the last day, week, month, quarter, year, etc.). The term $w(u,t)$ may specifically correspond to a number of times that the user has viewed and/or clicked on an information item pertaining to topic $t$ within the specified span of time.

The term $g_u(u,k)$ corresponds to some function that is dependent on the similarity between the user $u$ and another user $k$. For example, the function $g_u(u,k)$ can output a value of 1.0 when the user $u$ and the user $k$ belong to a same group, e.g., as when the user $u$ and the user $k$ have profiles indicating that they work in the same industry, or live in the same city, etc. It can output a value of 0 otherwise. In other implementations, the function $g_u(u,k)$ can apply different weights depending on the similarity between the user $u$ and the user $k$ across different respective affiliation-related dimensions. For example, the function $g_u(u,k)$ can apply a first weight when the two users belong to the same industry. It can apply a second weight when the users belong to the same city. It can apply a third weight when the users belong to the same industry and work in the same city, and so on.

The term $s_i(t, j)$ reflects the topic-to-topic score between the topic $t$ and the topic $j$, as obtained from the knowledge information 402 in the static knowledge graph. The value $s_i$(Seattle,Mariners) shown in FIG. 4 represents one instance of this term $s_i(t,j)$. Note that Equation (1) sums the topic-to-topic score $s_i(t,j)$ over different topics $j$, to overall provide an indication of the extent to which the topic $t$ is connected to other topics in the knowledge graph. Finally, the symbols $\alpha$ and $\beta$ reflect weighting parameter values, which can be empirically selected.

Overall, Equation (1) includes three components or parts. From left to right, the first component emphasizes the user's dynamic interests. The second component emphasizes the dynamic interests of the group(s) to which the user belongs. The third component is based on an assessed user-independent dynamic trend. Overall, Equation (1) represents the combination of the knowledge information 402 extracted from a static knowledge graph together with the dynamic trend information 404.

The RTPC 204, on the other hand, computes a relevance score $r_u(u, t, t')$ that expresses the strength of a relation between topic $t$ and topic $t'$, with respect to the dynamically changing interests of a user $u$. From a high-level perspective, $r_u(u, t, t')$ expresses the likelihood that a user $u$ who reads information items pertaining to topic $t$ will prefer to also read information items pertaining to topic $t'$. In one implementation, the RTPC 204 can generate the relevance score using the following equation:

$$r_u(u,t,t') = V(t,t')w(u,t,t') + \alpha \Sigma_{k \neq u} w(k,t,t') g_u(u,k) + \beta V(t,t') \Sigma_{j \neq t} s_i(t,j) \Sigma_{k \neq t} s_i(t',k) \quad (2).$$

In this equation, $V(t, t')$ represents a total volume of information items regarding topic $t$ OR topic $t'$ within a specified period of time. That is, $V(t, t')=V(t)+V(e)-V$(items pertaining to both $t$ and $t'$). $V(x)$ can be computed in the same manner specified above for Equation (1) (where $x$ refers to any topic, e.g., $t$ or $t'$). Note that $V(t, t')$ does not reflect the relationship between the topic pair $(t, t')$, but rather the relative importance of the topic pair $(t, t')$.

The term $w(u, t, t')$ refers to a number of times that a user $u$ views and/or selects information items pertaining to topic $t$ AND topic $t'$. In one implementation, $w(u, t, t')$ can be measured as a number of page views (e.g., impressions) and/or selections (e.g., "clicks") of topic $t$ by the user $u$, multiplied by the number of page views and/or selections for topic $t'$ by the user $u$. Note that $w(u, t, t')$ measures the closeness of topics $t$ and $t'$ with respect to the current interest of the user u. Hence, if it is determined that the user only interacts with the topic t within a given timeframe, but not the topic t', then value of w(u, t, t') would be 0 for this timeframe. Note that V(t, t') expresses a more general (e.g., global) trend compared to w(u, t, t').

Overall, Equation (2), like Equation (1), includes three components or parts. From left to right, the first component emphasizes the user's dynamic interests. The second component emphasizes the dynamic interests of the group(s) to which the user belongs. The third component is based on an assessed user-independent dynamic trend. More specifically, note that the third component aggregates the link strengths in the knowledge information 402 associated with the topic t to provide a first sum, aggregates the link strengths in the knowledge information 402 associated with the topic t' to provide a second sum, and then multiples the first sum by the second sum. Overall, Equation (2) represents the combination of the knowledge information 402 extracted from a static knowledge graph together with the dynamic trend information 404. Stated in other terms, Equation (2) represents the weights of the edges in the per-user dynamic ontology 406.

Equations (1) and (2) are set forth by way of illustration, not limitation. In other cases, the UI presentation component 106 can use a machine-trained statistical model to compute the value of $r_u$ (t) and/or $r_u$ (u, t, t'), or to compute portions thereof. In other cases, the UI presentation component 106 can use a rules-based engine to compute the value of $r_u$ (t) and/or $r_u$ (u, t, t'), or to compute portions thereof. In other cases, the UI presentation component 106 can use a hybrid approach to compute the value of $r_u$ (t) and/or $r_u$ (u, t, t'), e.g., by combining two or more different types of models, algorithms, equations, etc.

Figure 3:
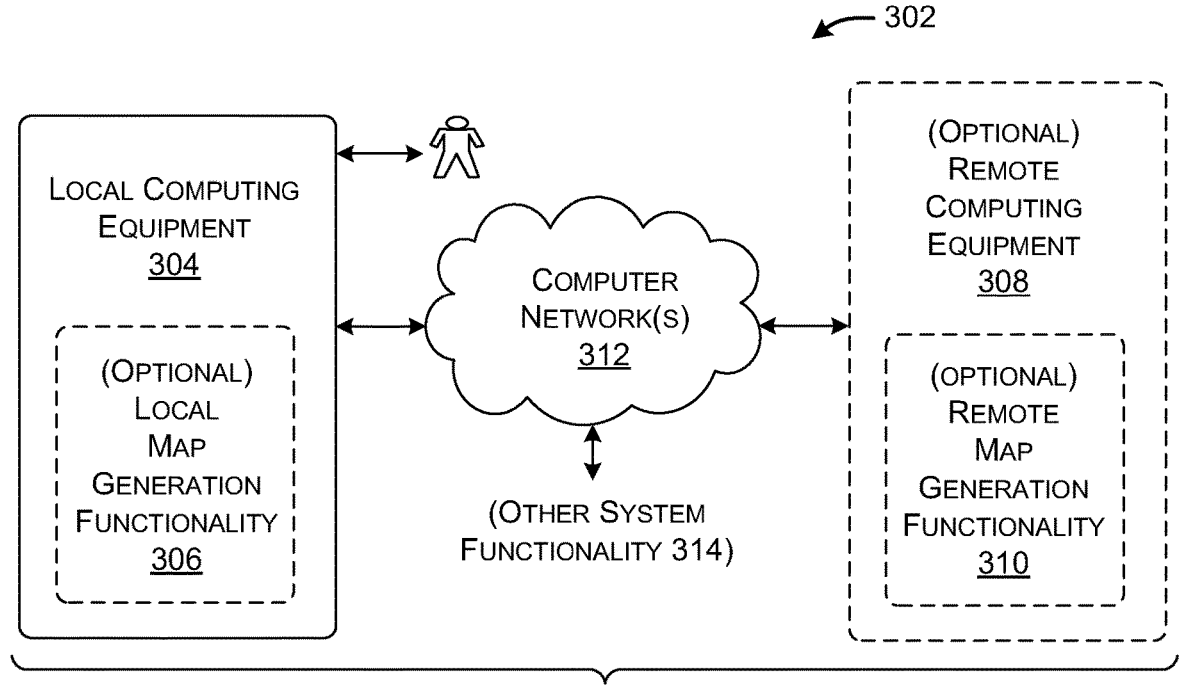
FIG. 3 shows computing equipment that can be used to implement the system of FIG. 1.

FIG. 3 shows computing equipment 302 that can be used to implement the system 102 of FIG. 1. In one implementation, the map generation component 104 is entirely implemented by local computing equipment 304. The local computing equipment 304 may correspond, for instance, to any of: a stationary desktop computing device, a set-top box, a game console device, a tablet-type computing device, a smartphone, a media consumption device, a wearable computing device, and so on, or any combination thereof. The local computing equipment 302 may implement the map generation component 104 using local map generation functionality 306, e.g., which may correspond to locally-stored code which implements the functions described above.

In another implementation, remote computing equipment 308 implements some or all of the functions of the map generation component 104. The remote computing equipment 302 may correspond to one or more server computing devices or the like, provided at a single location or distributed across multiple locations. The remote computing equipment 308 may implement parts (or all) of the map generation component 104 using remote map generation functionality 310, e.g., which may correspond to code which implements at least some of the functions described above.

One or more computer networks 312 couple the local computing equipment 304 to the remote computing equipment 308. The computer network(s) 312 may correspond to a wide area network (e.g., the Internet), a local area network, etc., or combination thereof.

The computing equipment 302 may also include other system functionality 314 which implements parts of the system 102 other than the map generation component 104. For example, the other system functionality 314 may include one or more server computing devices that implement any of the information sources (114, 118, 122, etc.) For example, one such information source may represent a search engine which provides user activity information to the map generation component 104.

More specifically, in a first concrete implementation of the computing equipment 302, the local computing equipment 304 includes a locally-stored application (app) which implements the entirety of the map generation component 104. In a second implementation, the local computing equipment 304 includes a local-stored application (app) which implements parts of the map generation component 104, but not the entire map generation component 104. In this second case, the remote computing equipment 308 may include logic which implements certain computationally-intensive operations, such as the calculation of the dynamic ontology 406. The local-stored application cooperatively interacts with the remotely implemented logic to carry out the tasks described above. In a third implementation, the remote computing equipment 308 implements all of the functions of the map generation component 104. In this third case, the local computing equipment 304 may access the remote functionality provided by the remote computing equipment 308 using a web browser program or the like.

Example

Figure 5:
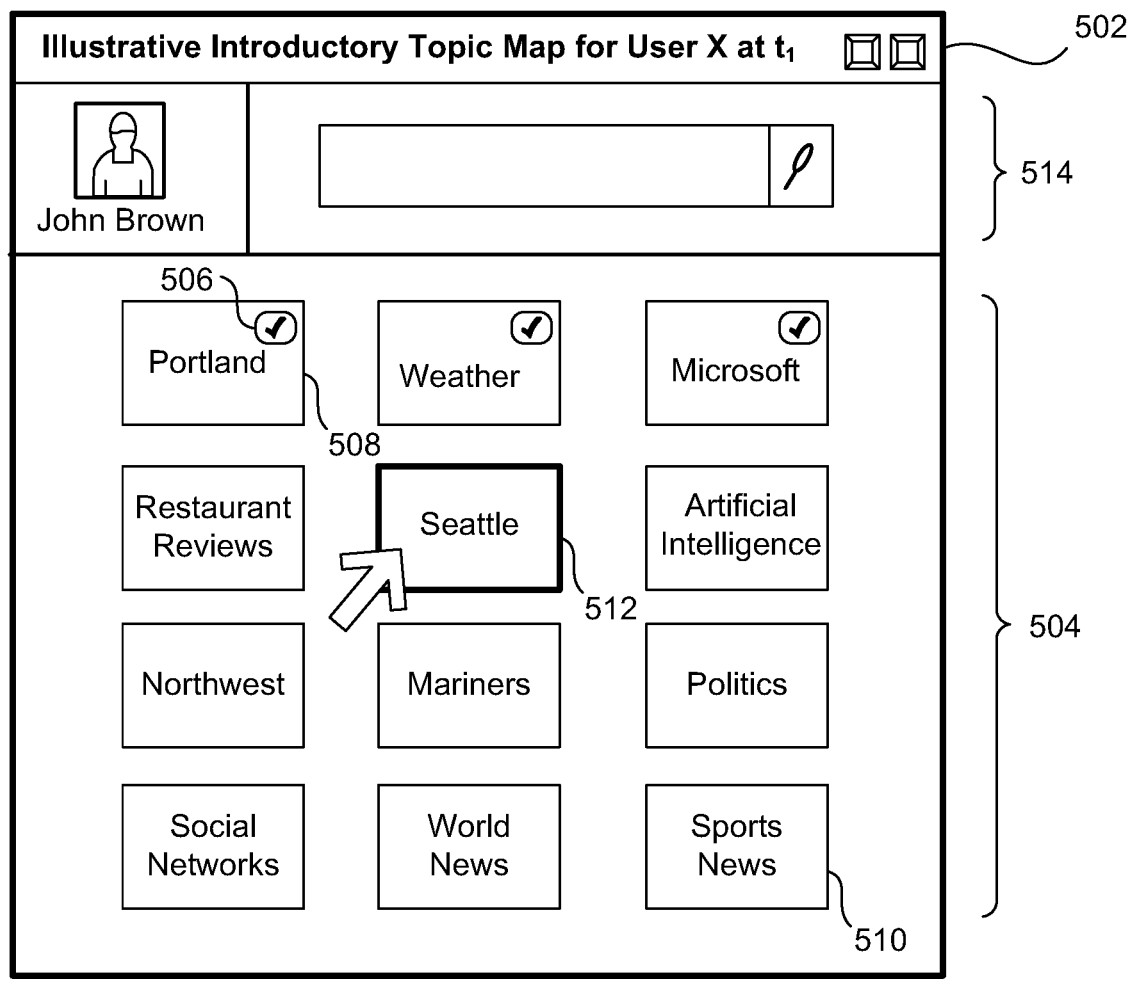
FIG. 5 shows an introductory user interface presentation that the map generation component can present to the user.

The remainder of Section A describes an example in which at least two users (user X and user Y) interact with the map generation component 104 to explore topics and to access relevant information items. Starting with FIG. 5, assume that a user X activates the map generation component 104 at time $t_1$. The ITPC 202 responds by (optionally) presenting a user interface presentation 502. The user interface presentation 502 presents a set of initial indicators 504, associated with respective initial topics. In one implementation, the ITPC 202 can identify at least some initial topics that match the explicitly-specified interests of the user X, e.g., as specified in that user's profile. In addition, or alternatively, the ITPC 202 can identify at least some initial topics by ranking candidate topics using Equation (1), and then selecting a subset of the highest-ranking candidate topics for inclusion in the set of initial topics. In one implementation, the ITPC 202 can provide some sort of indicia, such as a checkmark 506, which indicates that the corresponding initial topic is computed on the basis of explicitly-specified user interests, rather than Equation (1).

In some implementations, the ITPC 202 can arrange the initial indicators 504 based on the assessed relevance of their corresponding topics. For example, an indicator 508 illustrated in the upper left corner may correspond to a topic having the highest assessed relevance, and an indicator 510 illustrated in the lower right corner may correspond to a topic having the lowest assessed relevance. In other implementations, the ITPC 202 can display the set of initial indicators 504 in any order, such as a random order, an alphabetical order (based on the corresponding topic labels), etc.

Assume that the user next decides to explore the topic "Seattle," associated with the indicator 512. The user can perform this task by clicking on or otherwise selecting the indicator 512. In another case, a user may interact with a query input interface 514 to specify a custom topic. For example, assume that the set of initial indicators 504 does not include a topic category for "Seattle." The user may type the keyword "Seattle" into the query input interface 514. In any event, the topic "Seattle" becomes the home-focus topic, and the indicator associated with that topic is referred to as the home-focus indicator.

Figure 6:
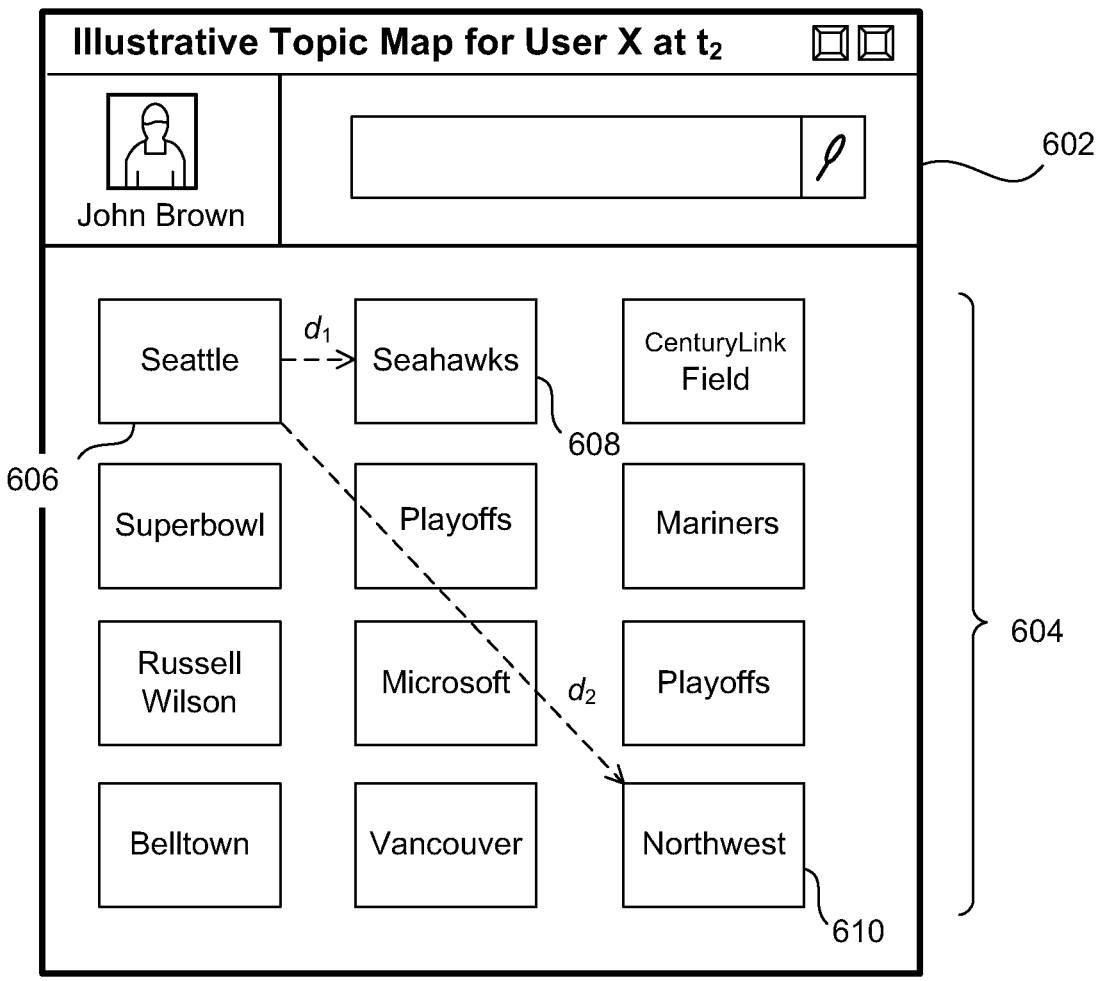
FIG. 6 shows a user interface presentation that the map generation component can present when the user selects an indicator in the introductory user interface presentation of FIG. 5.

FIG. 6 shows a user interface presentation 602 that is presented to the user X at time $t_2$ in response to the user's selection of the topic t, here corresponding to the topic of "Seattle." The RTPC 204 presents a second collection of indicators 604. The set of indicators 604 includes the home-focus indicator 606 associated with the home-focus topic t ("Seattle"), presented at a first location of the user interface presentation 602. The first location corresponds to a home-focus location. Each other indicator, corresponding to another topic t', has a location in the user interface presentation 602 that is separated from the home-focus location by a distance d. The distance d, in turn, is a function the relevance score $r_u(u_x, t, t')$ for user $u_x$ and topics (t, t'), as given by Equation (2). More specifically, the distance d decreases with increasing relevance score value, and increases with decreasing relevance score value. For example, assume that the topic of "Seahawks," associated with indicator 608, is more relevant to the topic of "Seattle" compared to the topic of "Northwest," associated with the indicator 610. This means that the RTPC 204 will display the indicator 608 (associated with "Seahawks") closer to the home-focus indicator 606 (associated with "Seattle") compared to the indicator 610 (associated with "Northwest"). But note that the RTPC 204 can use any layout strategy to represent the ranking of topics. For example, the RTPC 204 can alternatively present the home-focus indicator 606 in the center of a circle, with each of the other indicators radiating out from the center by the distance d. The topics that are most relevant to the home-focus topic have respective indicators closest to the home-focus indicator 606. Or the RTPC 204 can present a linear array of indicators, with the home-focus location corresponding to some position in the array (e.g., the left position, center position, or right position in the array).

Figure 7:
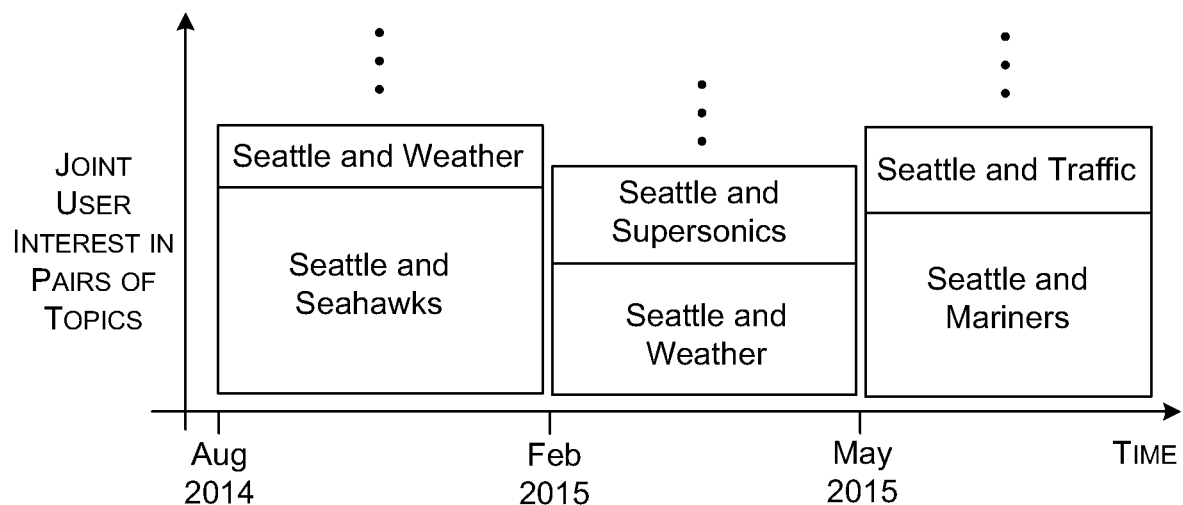
FIG. 7 shows a timeline that expresses an illustrative user's dynamically changing interests in combinations of topics.

FIG. 7 shows a timeline that expresses the user X's dynamically changing interests. For example, assume that the user resides in the city of Seattle in Washington State and is an avid sports fan. In the time between August and February, the user is most interested in news about a local football team, the Seahawks. In the time between February and May, the user turns his interest to news about the local basketball team, the Supersonics. In the time between May and August, the user turns his attention to news about the local baseball team, the Mariners.

Changes to the user's interest in individual topics may produce changes in the relationships in the links or edges by which the topics are related. For instance, assume that the user expresses relatively strong joint interest in the topics of "Seattle" and "Seahawks" in the months of August through January. In this time period, the user also expresses joint interest in the topics of "Seattle" and "weather." But after January, the user increases his joint interest in the topics of "Seattle" and "weather," while simultaneously decreasing his joint interest in the topics of "Seattle" and "Seahawks." At this point, the user also expresses joint interest in the concepts of "Seattle" and "Supersonics." In May, the user directs his attention to the pairing of topics for "Seattle" and "Mariners." Note that these expressions of joint interests are merely illustrative; another user can be expected to have a different evolution of interests compared to that shown in FIG. 7, e.g., because any user's interests may depend on a multitude of idiosyncratic personal factors.

Figure 8:
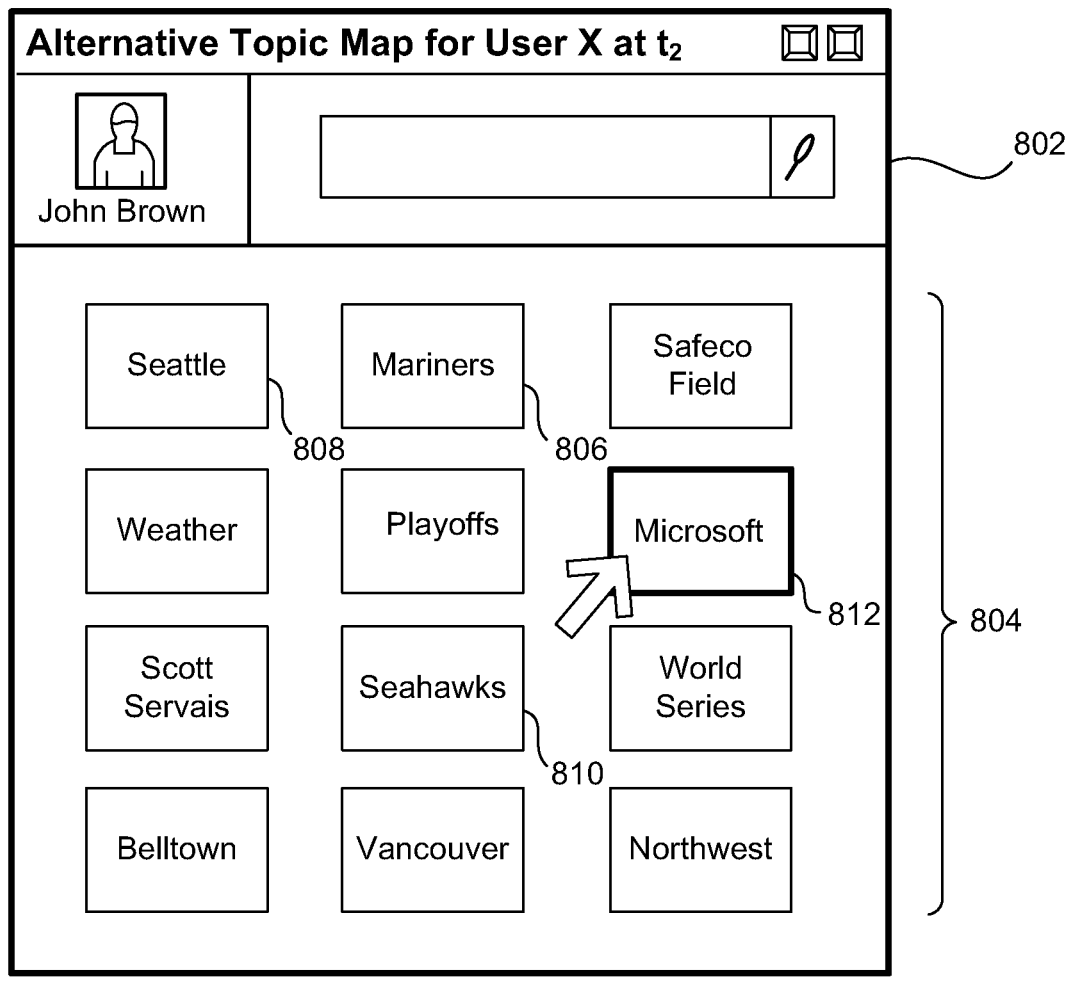
FIG. 8 shows an alternative user interface presentation that the map generation component can present when the user selects an indicator in the introductory user interface presentation of FIG. 5. The user interface presentation of FIG. 8 differs from the user interface presentation of FIG. 6 because the user interface presentations of FIGS. 6 and 8 are based on different user interests at different respective times.

In the example of FIG. 6, assume that the user has activated the home-focus topic of "Seattle" in the month of October. In response, the RTPC 204 can display the indicator 608 for "Seahawks" relatively close to the home-focus indicator 606 for "Seattle." In contrast, with respect to FIG. 8, assume that the user activates the home-focus topic of "Seattle" in the month of July. In response, the RTPC 204 can present a user interface presentation 802 having a set of indicators 804 in which an indicator 806 for the topic of "Mariners" appears close to the home-focus indicator 808 for the topic of "Seattle." Further note that the indicator 810 for "Seahawks" may still appear, but it is presented farther from the home-focus indicator 808 compared to the example of FIG. 6.

As a point of clarification, note that the above-described pairing of interests does not hinge on the user's interest in individual topics in isolation, but rather depends on the user's joint interest in combinations or relations of topics. For example, a user may move to another city and stop expressing an interest in news about the city of Seattle as a whole, while otherwise maintaining an avid interest in the Seahawks football team. In that case, the pairing of "Seattle" and "Seahawks" might not have a strong relevance score for this particular user, but a pairing of "Seahawks" and some other topic may continue to have a relatively strong score (such as the pairing of "Playoffs" and "Seahawks"). Hence, in this scenario, the user would no longer see an indicator for "Seahawks" in response to activating the indicator for "Seattle," but he would continue to see an indicator for "Seahawks" in response to activating an indicator for "Playoffs."

Figure 9:
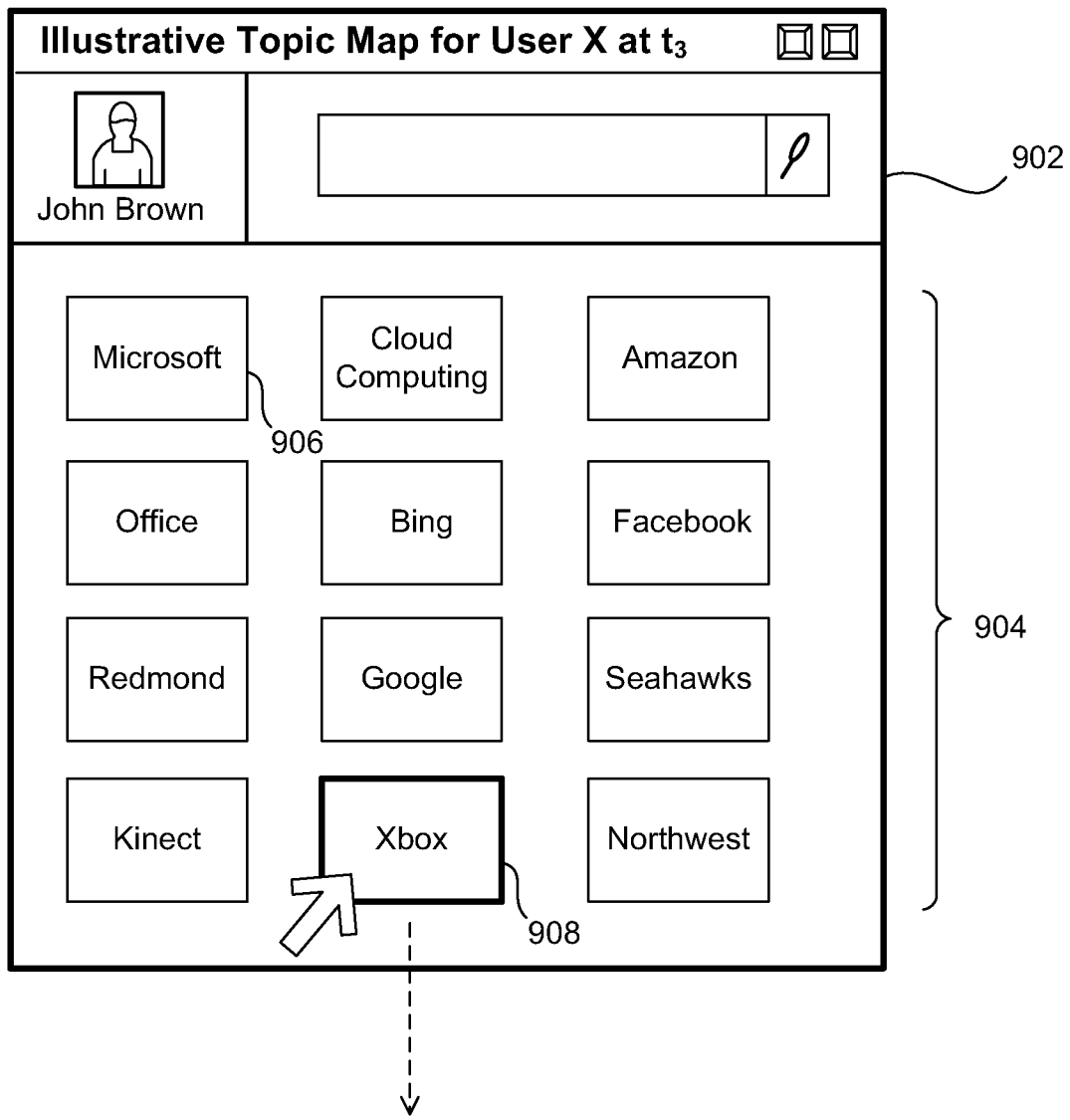
FIG. 9 shows a user interface presentation that the map generation component can present when the user selects an indicator in the introductory user interface presentation of FIG. 8.

Next assume that the user selects an indicator 812 associated with the topic of "Microsoft," e.g., corresponding to the computer technology company by the name of MICROSOFT CORPORATION of Redmond, Wash. In response, the RTPC 204 presents the user interface presentation 902 shown in FIG. 9. That user interface presentation 902 includes a collection of indicators 904, with the home-focus indicator 906 now corresponding to the home-focus topic of "Microsoft." The other indicators correspond to other respective topics that are related to the topic of "Microsoft," as assessed by the RTPC 204. Again, the distance between the home-focus indicator 906 and any other indicator is based on the relevance score $r_u(u, t, t')$ given by Equation (2).

Assume that, at time $t_3$, the user now executes an instruction to view information items pertaining to the topic indicator 908, corresponding to the topic of "Xbox". More specifically, the user may activate the topic indicator 908 in different ways to invoke different response behavior. The user may activate the topic indicator 908 using a first predetermined gesture when he wishes to activate another topic map (not shown) in which the topic of "Xbox" now assumes the role of the home-focus indicator. The user may activate the topic indicator 908 using a second predetermined gesture when he wishes to examine information items (e.g., news articles) pertaining to the topic of "Xbox." Assume that the user executes the second gesture. The item retrieval component 206 responds by providing a list or other kind of compilation of information items pertaining to the subject of "Xbox." The user may further drill into this compilation to read any individual information item specified therein.

Figure 10:
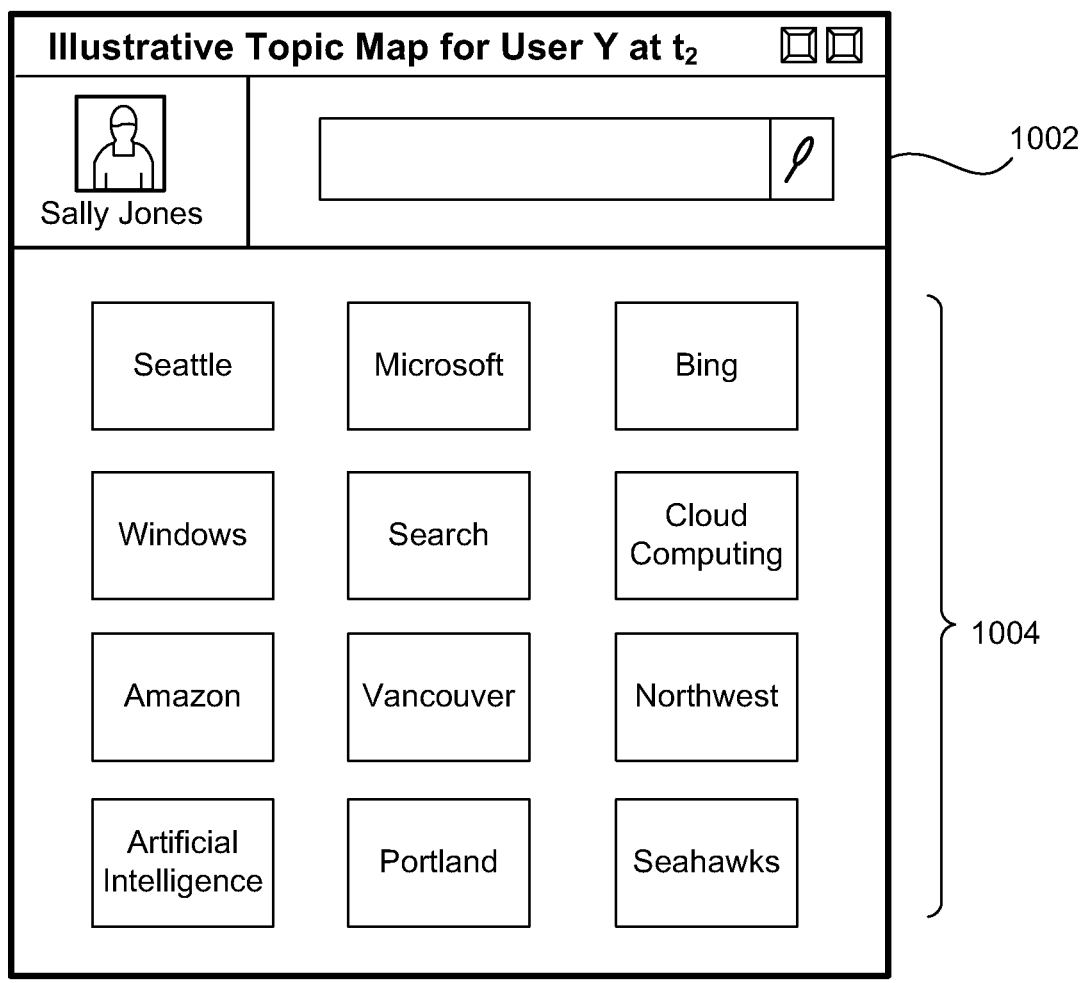
FIG. 10 shows a user interface presentation that the map generation component can present to another user having different interests compared to the above-mentioned user.

Finally, FIG. 10 shows a user interface presentation 1002 that the RTPC 204 can present to another user (user Y) having different interests compared to the first-mentioned user (user X). For example, while the user X is primarily interested in sports-related topics, assume that the user Y is primarily interested in computer-related topics. Hence, the RTPC 204 presents a set of indicators 1004 that emphasize technology-related subjects, to a greater extent compared to the user interface presentation 602 provided to user X in FIG. 6.

In conclusion to Section A, the map generation component 104 has various technical merits. For example, the map generation component 104 can facilitate a user's exploration of topics and the selection of relevant information items. This is because the map generation component 104 exposes a user to initial topics and relationships among topics without the user having to know about these topics beforehand. Further, the map generation component 104 presents a visualization that emphasizes the trending interests of a particular user. Overall, the visualization more quickly exposes the topics that may interest the user, thereby allowing the user to more quickly find relevant information items. This performance feature provides good user experience. It also reduces consumption of computing resources (processing resources, memory resources, communication resources, etc.) because the user is allowed to forgo an extended search session, and the resources consumed thereby.

B. Illustrative Processes

Figure 11:
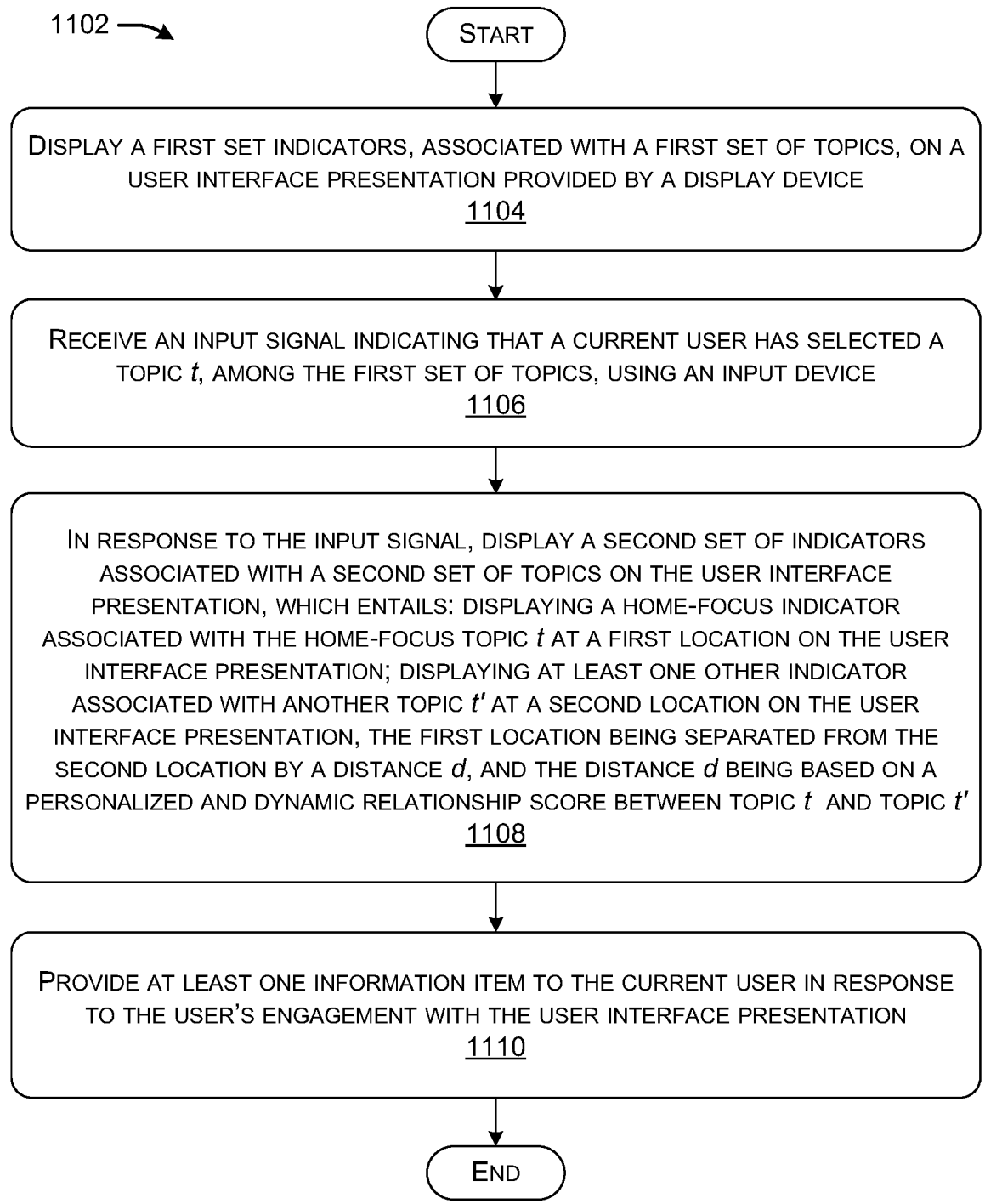
FIG. 11 shows a process that represents one manner of operation of the map generation component of FIG. 1.

FIG. 11 shows a process 1102 that explains the operation of the map generation component 104 of Section A in flowchart form. Since the principles underlying the operation of the map generation component 104 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

In block 1104, the map generation component 104 displays a first set indicators, associated with a first set of topics, on a user interface presentation provided by a display device. The first set of topics may correspond to an initial set of topics that is selected based, at least in part, on the explicitly-identified interests of the current user and/or the relevance scores provided by Equation (1). In another scenario, the first set of topics may correspond to topics that the map generation component 104 provides in response to manual specification, by the current user, of an initial home-focus topic $t_{initial}$, or by default specification of the initial home-focus topic.

In block 1106, the map generation component 104 receives an input signal, indicating that a current user has selected a topic t, among the first set of topics, using an input device. In block 1108, in response to the input signal, the map generation component 104 displays a second set of indicators associated with a second set of topics on the user interface presentation.

More specifically, the operation of displaying the second set of indicators includes: displaying a home-focus indicator associated with the topic t at a first location (a "home-focus location") on the user interface presentation; displaying at least one other indicator associated with another topic t' at a second location on the user interface presentation, the first location being separated from the second location by a distance d. The distance d, in turn, is based on at least: a similarity between the topic t and the topic t' as expressed by a knowledge graph; and a joint interest in the topic t and the topic t' as expressed by at least the current user within a specified span of time.

In block 1110, the map generation component 104 provides at least one information item to the current user in response to engagement by the current user with the user interface presentation. For example, the map generation component 104 may provide a list of information items pertaining to a topic selected by the user in the second set of topics.

C. Representative Computing Functionality

Figure 12:
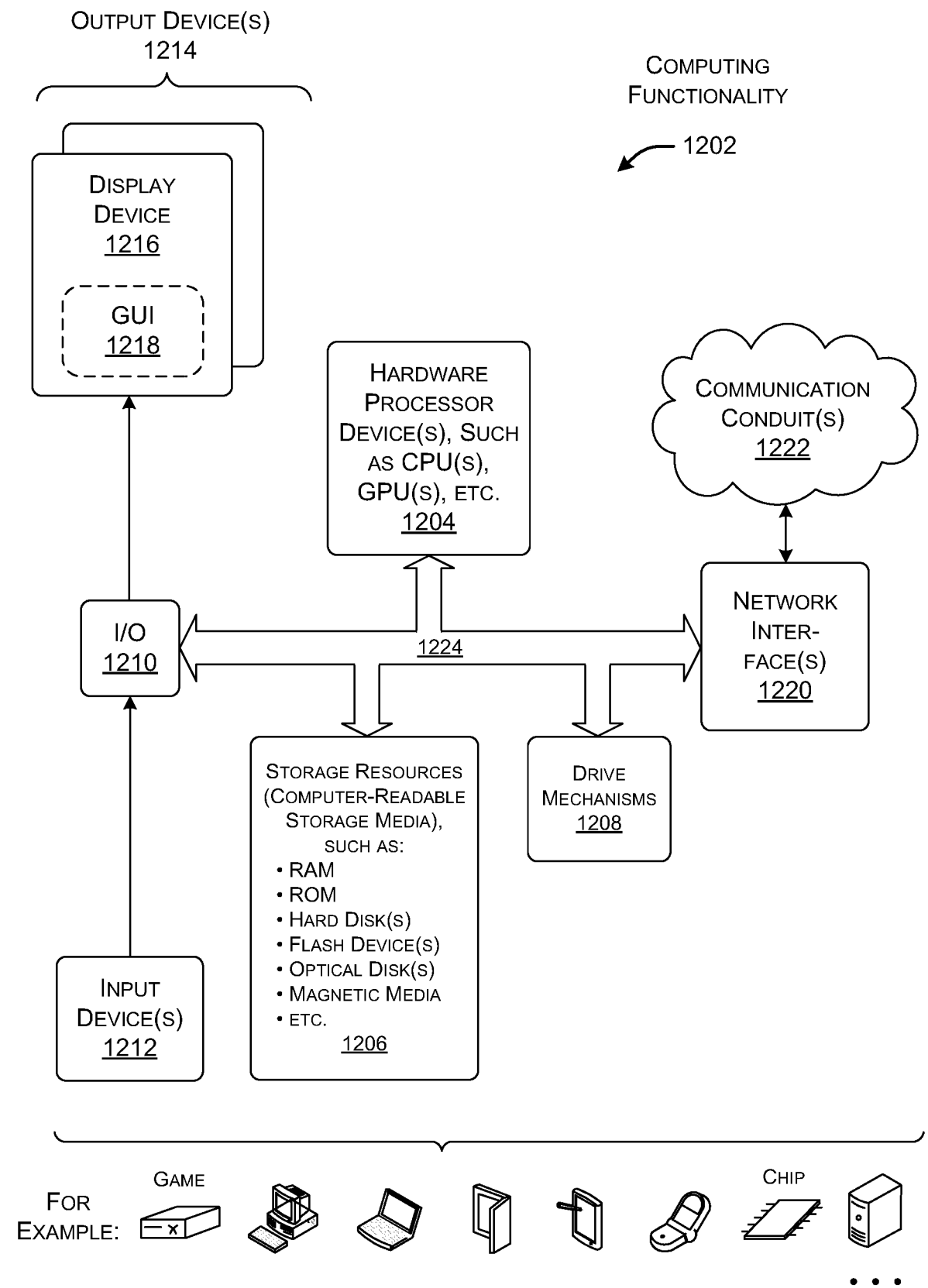
FIG. 12 shows illustrative computing functionality that can be used to implement any aspect of the features shown in the foregoing drawings.

FIG. 12 shows computing functionality 1202 that can be used to implement any aspect of the mechanisms set forth in the above-described figures. For instance, the type of computing functionality 1202 shown in FIG. 12 can be used to implement any of the local computing equipment 304 and/or the remote computing equipment 308 of FIG. 3. In all cases, the computing functionality 1202 represents one or more physical and tangible processing mechanisms.

The computing functionality 1202 can include one or more hardware processor devices 1204, such as one or more central processing units (CPUs), and/or one or more graphical processing units (GPUs), and so on. The computing functionality 1202 can also include any storage resources (also referred to as computer-readable storage media or computer-readable storage medium devices) 1206 for storing any kind of information, such as machine-readable instructions, settings, data, etc. Without limitation, for instance, the storage resources 1206 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1202. The computing functionality 1202 may perform any of the functions described above when the hardware processor device(s) 1204 carry out computer-readable instructions stored in any storage resource or combination of storage resources. The computing functionality 1202 also includes one or more drive mechanisms 1208 for interacting with any storage resource, such as a hard disk drive mechanism, an optical disk drive mechanism, and so on.

The computing functionality 1202 also includes an input/output component 1210 for receiving various inputs (via input devices 1212), and for providing various outputs (via output devices 1214). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 1216 and an associated graphical user interface presentation (GUI) 1218. The map generation component 104 can present its various user interface presentations shown in the figures on the display device 1216. The display device 1216 may correspond to a charge-coupled display device, a cathode ray tube device, a projection mechanism, etc. Other output devices include a printer, a model-generating mechanism, a tactile output mechanism, an archival mechanism (for storing output information), and so on. The computing functionality 1202 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area computer network, a wide area computer network (e.g., the Internet), point-to-point connections, etc., or any combination thereof. The communication conduit(s) 1222 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1202 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method is described, that is implemented by one or more computing devices, for facilitating discovery of information items. The method includes the operations of: displaying a first set indicators, associated with a first set of topics, on a user interface presentation provided by a display device; receiving an input signal indicating that a current user has selected a topic t, among the first set of topics, using an input device; and, in response to the input signal, displaying a second set of indicators associated with a second set of topics on the user interface presentation. The displaying of the second set of indicators includes the operations of: displaying a home-focus indicator associated with the topic t at a first location on the user interface presentation; and displaying at least one other indicator associated with another topic t' at a second location on the user interface presentation. The first location is separated from the second location by a distance d. The distance d is based on at least: a similarity between the topic t and the topic t' as expressed by a knowledge graph; and a joint interest in the topic t and the topic t' as expressed by at least the current user within a specified span of time.

According to a second aspect, the method further includes an operation of providing at least one information item to the current user in response to engagement by the current user with the user interface presentation.

According to a third aspect, the method further includes: receiving another input signal indicating that the current user has selected the topic t', among the second set of topics, using the input device; and, in response to the other input signal, displaying a third set of indicators associated with a third set of topics, on the user interface presentation. The displaying of the third set of indicators includes displaying an updated home-focus indicator associated with the topic t' at the first location on the user interface presentation.

According to a fourth aspect, the first set of topics is an initial set of topics that is presented to the current user, and wherein the method further comprises identifying the initial set of topics based on one or more identified interests of the current user.

According to a fifth aspect, the first set of topics is alternatively provided in response to specification of an initial topic $t_{initial}$.

According to a sixth aspect, the joint interest in the topic t and the topic t', as expressed by at least the current user, reflects engagement by the current user with information items associated with both the topic t and the topic t' within the specified span of time.

According to a seventh aspect, the above-referenced engagement by the current user is based on a number of times the current user has selected and/or viewed information items associated with the topic t within the specified span of time, together with a number of times the current user has selected and/or viewed information items associated with the topic t' within the specified span of time.

According to an eighth aspect, the distance d is further based on a joint interest in the topic t and the topic t' as expressed by at least one group of users, within the specified span of time, the current user being associated with the group(s) of users.

According to a ninth aspect, the distance d is further based on an assessed user-independent dynamic trend pertaining to the topic t and the topic t' within the specified span of time.

According to a tenth aspect, one or more computing devices are described that implement a map generation component. The device(s) include a user interface presentation component configured to: display a first set indicators, associated with a first set of topics, on a user interface presentation provided by a display device; receive an input signal indicating that a current user has selected a topic t, among the first set of topics, using an input device; and, in response to the input signal, display a second set of indicators associated with a second set of topics on the user interface presentation. The displaying of the second set of indicators includes displaying a home-focus indicator associated with the topic t at a first location on the user interface presentation, and displaying at least one other indicator associated with another topic t' at a second location on the user interface presentation, the first location being separated from the second location by a distance d that is computed based on a relevance score. The device(s) also include a relevance computing component that is configured to compute the relevance score based on: a similarity between the topic t and the topic t', as expressed by a knowledge graph; and a trend in interest by the current user with respect to both the topic t and the topic t'.

According to an eleventh aspect, a computer-readable storage medium is described for storing computer-readable instructions. The computer-readable instructions, when executed by one or more processor devices, perform a method that comprises: identifying a first, initial, set of topics based on one or more identified interests of a current user; displaying a first set indicators, associated with the first set of topics, on a user interface presentation provided by a display device; receiving an input signal indicating that a current user has selected a topic t, among the first set of topics, using an input device; and, in response to the input signal, displaying a second set of indicators associated with a second set of topics on the user interface presentation. The displaying of the second set of indicators includes: displaying a home-focus indicator associated with the topic t at a first location on the user interface presentation; and displaying at least one other indicator associated with another topic t' at a second location on the user interface presentation. The first location is separated from the second location by a distance d, where the distance d is based on at least: a similarity between the topic t and the topic t' as expressed by a knowledge graph; and a dynamic measure which expresses a personalized current interest by the current user in the topic t and the topic t'. The method further includes an operation of providing at least one information item to the current user in response to engagement by the current user with the user interface presentation.

A twelfth aspect corresponds to any combination (e.g., any permutation or subset) of the above-referenced first through eleventh aspects.

A thirteenth aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twelfth aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by one or more computing devices, for facilitating discovery of information items, comprising:
    displaying a first set indicators, associated with a first set of topics, on a user interface presentation provided by a display device;
    receiving an input signal indicating that a current user has selected a topic t, among the first set of topics, using an input device;
    in response to the input signal, displaying a second set of indicators associated with a second set of topics on the user interface presentation,
    said displaying of the second set of indicators including:
        displaying a home-focus indicator associated with the topic t at a first location on the user interface presentation; and
        displaying at least one other indicator associated with another topic t' at a second location on the user interface presentation,
        the first location being separated from the second location by a distance d, the distance d being based on at least:
            a similarity between the topic t and the topic t' as expressed by a knowledge graph; and
            a joint interest in the topic t and the topic t' as expressed by at least the current user within a specified span of time, wherein the joint interest in the topic t and the topic t' depends on a combination of: a number of times that the current user interacts with information items pertaining to the topic t within the specified span of time; and a number of times that the current user interacts with information items pertaining to the topic t' within the specified span of time; and
    providing at least one information item to the current user in response to engagement by the current user with the user interface presentation.

2. The method of claim 1, further comprising:
    receiving another input signal indicating that the current user has selected the topic t', among the second set of topics, using the input device; and
    in response to the other input signal, displaying a third set of indicators associated with a third set of topics, on the user interface presentation,
    said displaying of the third set of indicators including displaying an updated home-focus indicator associated with the topic t' at the first location on the user interface presentation.

3. The method of claim 1, wherein the first set of topics is an initial set of topics that is presented to the current user, and wherein the method further comprises identifying the initial set of topics based on one or more identified interests of the current user.

4. The method of claim 1, wherein the first set of topics is provided in response to specification of an initial topic $t_{initial}$.

5. The method of claim 1, wherein the current user interacts with a particular information item by selecting and/or viewing the particular information item.

6. The method of claim 1, wherein the distance d is further based on a joint interest in the topic t and the topic t' as expressed by at least one group of users, within the specified span of time, the current user being associated with said at least one group of users.

7. The method of claim 1, wherein the distance d is further based on an assessed user-independent dynamic trend pertaining to the topic t and the topic t' within the specified span of time.

8. The method of claim 1, wherein the joint interest in the topic t and the topic t' depends on a product of: the number of times that the current user interacts with the information items pertaining to the topic t within the specified span of time; and the number of times that the current user interacts with the information items pertaining to the topic t' within the specified span of time.

9. The method of claim 1, wherein the information items include instances of information retrievable via a search engine and/or messages exchanged between users.

10. One or more computing devices that implement a map generation component, comprising:
    a user interface presentation component configured to:
        display a first set indicators, associated with a first set of topics, on a user interface presentation provided by a display device;
        receive an input signal indicating that a current user has selected a topic t, among the first set of topics, using an input device; and
        in response to the input signal, display a second set of indicators associated with a second set of topics on the user interface presentation,
        said displaying of the second set of indicators including displaying a home-focus indicator associated with the topic t at a first location on the user interface presentation, and displaying at least one other indicator associated with another topic t' at a second location on the user interface presentation, the first location being separated from the second location by a distance d that is computed based on a relevance score; and
    a relevance computing component configured to compute the relevance score based on: a similarity between the topic t and the topic t', as expressed by a knowledge graph; and a trend in interest by the current user with respect to both the topic t and the topic t', wherein the trend in interest in the topic t and the topic t' depends on a combination of: a number of times that the current user interacts with information items pertaining to the topic t within a specified span of time; and a number of times that the current user interacts with information items pertaining to the topic t' within the specified span of time.

11. The one or more computing devices of claim 10, wherein the user interface presentation component is further configured to provide at least one information item to the current user in response to engagement by the current user with the user interface presentation.

12. The one or more computing devices of claim 10, wherein the user interface presentation component is further configured to:
receive another input signal indicating that the current user has selected the topic t', among the second set of topics, using the input device; and
in response to the other input signal, display a third set of indicators associated with a third set of topics, on the user interface presentation, including displaying an updated home-focus indicator associated with the topic t' at the first location on the user interface presentation.

13. The one or more computing devices of claim 10, wherein the first set of topics is an initial set of topics that is presented to the current user, and wherein the user interface presentation component is further configured to identify the initial set of topics based on one or more identified interests of the current user.

14. The one or more computing devices of claim 10, wherein the user interface presentation component is configured to present the first set of topics in response to specification of an initial topic $t_{initial}$.

15. The one or more computing devices of claim 10, wherein the current user interacts with a particular information item by selecting and/or viewing the particular information item.

16. The one or more computing devices of claim 10, wherein the distance d is further based on an interest in the topic t and the topic t' as expressed by at least one group of users, within the specified span of time, the current user being associated with said at least one group of users.

17. The one or more computing devices of claim 10, wherein the distance d is further based on an assessed user-independent dynamic trend pertaining to the topic t and the topic t'.

18. A computer-readable storage medium for storing computer-readable instructions, the computer-readable instructions, when executed by one or more processor devices, performing a method that comprises:
identifying a first, initial, set of topics based on one or more identified interests of a current user;
displaying a first set indicators, associated with the first set of topics, on a user interface presentation provided by a display device;
receiving an input signal indicating that a current user has selected a topic t, among the first set of topics, using an input device;
in response to the input signal, displaying a second set of indicators associated with a second set of topics on the user interface presentation,
said displaying of the second set of indicators including:
displaying a home-focus indicator associated with the topic t at a first location on the user interface presentation; and
displaying at least one other indicator associated with another topic t' at a second location on the user interface presentation,
the first location being separated from the second location by a distance d, the distance d being based on at least: a similarity between the topic t and the topic t' as expressed by a knowledge graph; and a dynamic measure which expresses a personalized current interest by the current user in the topic t and the topic t', wherein the dynamic measure depends on a combination of: a number of times that the current user interacts with information items pertaining to the topic t within a specified span of time; and a number of times that the current user interacts with information items pertaining to the topic t' within the specified span of time; and
providing at least one information item to the current user in response to engagement by the current user with the user interface presentation.

19. The computer-readable storage medium of claim 18, wherein the method further comprises:
receiving another input signal indicating that the current user has selected the topic t', among the second set of topics, using the input device; and
in response to the other input signal, displaying a third set of indicators associated with a third set of topics, on the user interface presentation,
said displaying of the third set of indicators including displaying an updated home-focus indicator associated with the topic t' at the first location on the user interface presentation.

20. The computer-readable storage medium of claim 18,
wherein the distance d is further based on a dynamic interest in the topic t and the topic t' as expressed by at least one group of users, within the specified span of time, the current user being associated with said at least one group of users, and
wherein the distance d is further based on an assessed user-independent trend pertaining to the topic t and the topic t' within the specified span of time.

* * * * *